(12) United States Patent
Chen

(10) Patent No.: US 11,853,490 B2
(45) Date of Patent: Dec. 26, 2023

(54) ELECTROMAGNETIC PEN WITH A FRONT END HAVING MAGNETIC CONDUCTIVITY

(71) Applicant: Daiyun Chen, Shenzhen (CN)

(72) Inventor: Daiyun Chen, Shenzhen (CN)

( * ) Notice: Subject to any disclaimer, the term of this patent is extended or adjusted under 35 U.S.C. 154(b) by 0 days.

(21) Appl. No.: 18/075,662

(22) Filed: Dec. 6, 2022

(65) Prior Publication Data

US 2023/0367404 A1 Nov. 16, 2023

(30) Foreign Application Priority Data

May 10, 2022 (CN) .......................... 202221124642.9

(51) Int. Cl.
*G06F 3/0354* (2013.01)
*H01F 38/14* (2006.01)

(52) U.S. Cl.
CPC ......... *G06F 3/03545* (2013.01); *H01F 38/14* (2013.01); *H01F 2038/143* (2013.01)

(58) Field of Classification Search
CPC . G06F 3/03545; H01F 38/14; H01F 2038/143
See application file for complete search history.

(56) References Cited

U.S. PATENT DOCUMENTS

| 5,949,501 A * | 9/1999 | Izuno ..................... G06F 3/045 |
| | | 349/23 |
| 8,134,542 B2 * | 3/2012 | Hagen ................. G06F 3/03545 |
| | | 178/19.03 |
| 2015/0084934 A1* | 3/2015 | Ho ....................... G06F 3/03545 |
| | | 345/179 |

FOREIGN PATENT DOCUMENTS

| EP | 1950772 B1 * | 10/2016 | ............. G01D 5/208 |
| WO | WO-2021150036 A1 * | 7/2021 | ......... G06F 3/03545 |

* cited by examiner

*Primary Examiner* — Michael Pervan
(74) *Attorney, Agent, or Firm* — Jeenam Park

(57) ABSTRACT

An electromagnetic pen with a front end having magnetic conductivity, comprising a pen housing, an inductance component, and a PCB board, the inductance component and the PCB board are arranged in the pen housing and the inductance component is electrically connected to the PCB board. The front end of the pen housing is provided with a front magnetic conductive shell, the front magnetic conductive shell is made of magnetic conductive material, wherein a coil is arranged in the front magnetic conductive shell, and the coil is electrically connected to the PCB board. A front end of a pen core protrudes from the front magnetic conductive shell, and the front magnetic conductive shell makes the distribution of the magnetic field lines closer to the pen tip, which can meet the magnetic conductivity conditions in electromagnetic induction and improve the characteristics of the magnetic field lines of the inclination angle.

6 Claims, 1 Drawing Sheet

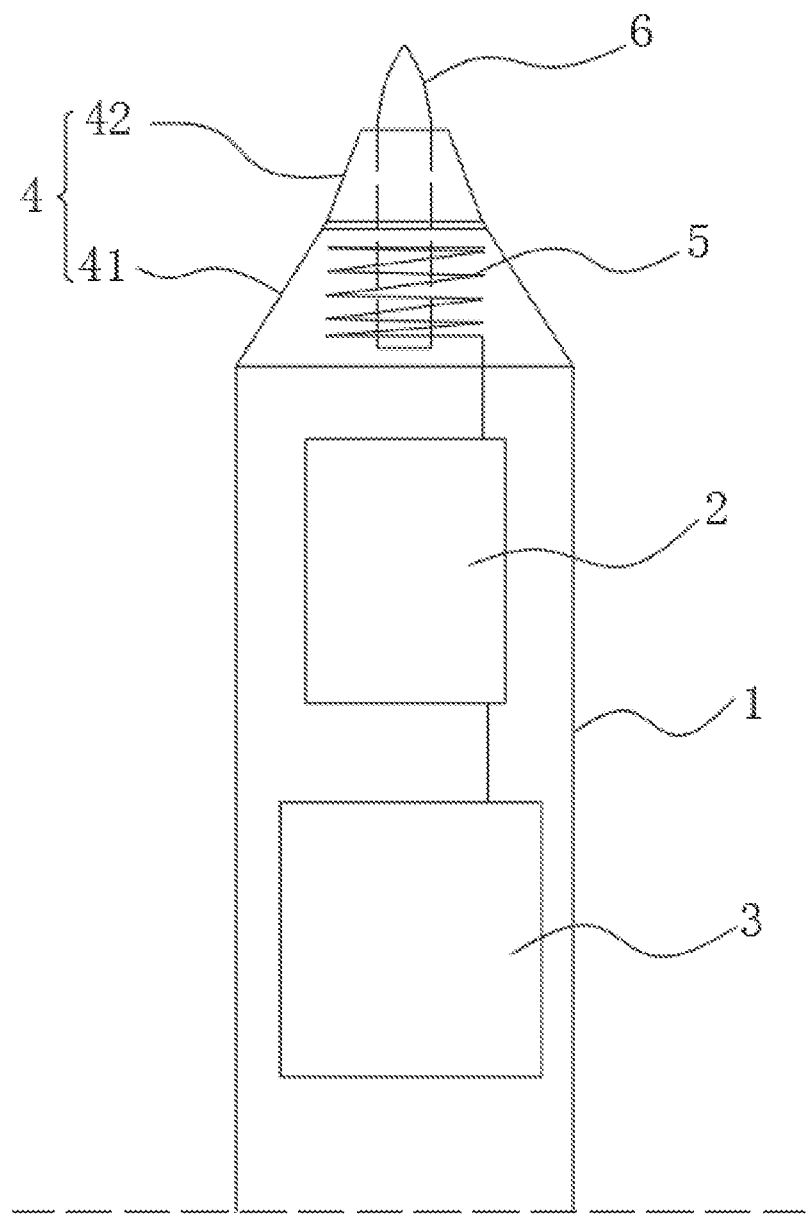

ELECTROMAGNETIC PEN WITH A FRONT END HAVING MAGNETIC CONDUCTIVITY

CROSS-REFERENCE TO RELATED APPLICATIONS

This application claims the benefit and priority of Chinese patent application No. 202221124642.9, filed on May 10, 2022, disclosure of which is hereby incorporated by reference in its entirety.

TECHNICAL FIELD

The present application relates to the field of electromagnetic pens, in particular to an electromagnetic pen with a front end having magnetic conductivity.

BACKGROUND

In recent years, with the development of science and technology, handwriting and hand-painting have become more and more widely used in many markets such as the animation industry and the signing and approval industry, resulting in the widespread use of digital tablets and digital screens. Along with this, more and more electromagnetic pens are used together with the digital tablet and the digital screen. The electromagnetic pen uses the principle of electromagnetic induction to sense the movement trajectory of the pen tip, so as to realize the input of signals to the digital tablet and digital screen. At present, the electromagnetic pen structure on the market generally uses a built-in inductor with a magnetic core in the front end housing of the pen. Because users often need to tilt the electromagnetic pen at a certain angle to achieve the same experience as a real pen, so as to bring a better pen-holding experience to the user, the front end of the pen generally cannot be designed to be too thick. This limits the size, shape and location of the inductor inside the pen tip. In order to get a better experience, the inductance is as close as possible to the pen tip, but due to the shape of the front end housing of the pen, the inductance inside the pen tip cannot be unlimitedly close to the pen tip. Generally, there will be a 2-3 mm gap due to the structure and manufacturing process constraints. As a result, the electromagnetic induction performance is average, and the displacement of the pen tip cannot be sensed more accurately.

SUMMARY

In view of the above-mentioned defects in the prior art, the technical problem to be solved by the present application is how to improve the electromagnetic induction capability at the tip of the electromagnetic pen, and for this purpose, an electromagnetic pen with a front end having magnetic conductivity is provided, and the specific technical solution is as follows:

An electromagnetic pen with a front end having magnetic conductivity, comprising a pen housing, an inductance component, and a PCB board, the inductance component and the PCB board are arranged in the pen housing and the inductance component is electrically connected to the PCB board, wherein a front end of the pen housing is provided with a front magnetic conductive shell, and the front magnetic conductive shell is made of magnetic conductive material, a coil is arranged in the front magnetic conductive shell, and the coil is electrically connected to the PCB board, a front end of a pen core protrudes from the front magnetic conductive shell.

As a preferred solution of the present application, the front magnetic conductive shell is composed of a large round table and a small round table with a hollow structure, an upper end of the pen housing is connected to the larger diameter end of the large round table, the smaller diameter end of the large round table is connected to the larger diameter end of the small round table, and the front end of the pen core extends from the smaller diameter end of the small round table.

As a preferred solution of the present application, the magnetic conductive material is a soft magnetic material.

As a preferred solution of the present application, the front magnetic conductive shell is injection-molded.

As a preferred solution of the present application, the inductance component is a variable capacitance component or a variable inductance component.

As a preferred solution of the present application, the PCB board is provided with an LC resonant circuit.

The advantages of the present application are:
1. The front end of the pen housing is provided with a front magnetic conductive shell, and a front end of a pen core protrudes from the front magnetic conductive shell, which makes the distribution of the magnetic field lines closer to the pen tip, and meets the magnetic conductivity conditions in electromagnetic induction and improve the characteristics of the magnetic field lines of the inclination angle, and has strong practicability and more accurate electromagnetic induction;
2. The front magnetic conductive shell is composed of a large round table and a small round table with a hollow structure, and the design is reasonable, so that the pen conforms to a better ergonomic shape, and the user has a better sense of use;
3. The magnetic conductive material is a soft magnetic material and is injection-molded, with excellent performance, which is conducive to processing and processing precision control.

BRIEF DESCRIPTION OF DRAWINGS

FIG. 1 is a schematic structural diagram of the present application.

DETAILED DESCRIPTION

The specific embodiments of the present application will be further described in conjunction with the accompanying drawings:

In the description of this application, it should be noted that the orientation or positional relationship indicated by the terms "center", "upper", "lower", "left", "right", "vertical", "horizontal", "inner", "outer", etc. is the orientation or positional relationship is based on the orientation or positional relationship shown in the accompanying drawings, which is only for the convenience of describing the present application and simplifying the description, rather than indicating or implying that the indicated position or element must have a particular orientation, be constructed and operate in a particular orientation, and therefore should not be construed as limitations on the present application.

In the description of the present application, it should be noted that, unless otherwise expressly specified and limited, the terms "arranged", "connected" and "connect" should be understood in a broad sense, for example, it may be a fixed connection or a detachable connection, or integral connection; could be mechanical connection, can also be electrical connection; can be directly connected, can also be indirectly connected through an intermediate medium, can be internal communication between two elements. For those of ordinary skill in the art, the specific meanings of the above terms in the present application can be understood according to specific circumstances.

As shown in FIG. 1, the electromagnetic pen with a front end having magnetic conductivity comprises a pen housing 1, an inductance component 2, and a PCB board 3, the inductance component 2 and the PCB board 3 are arranged in the pen housing 1 and the inductance component 2 is electrically connected to the PCB board 3, wherein a front end of the pen housing 1 is provided with a front magnetic conductive shell 4, and the front magnetic conductive shell 4 is made of magnetic conductive material, a coil 5 is arranged in the front magnetic conductive shell 4, and the coil 5 is electrically connected to the PCB board 3, a front end of a pen core 6 protrudes from the front magnetic conductive shell 4. The front magnetic conductive shell 4 is close enough to the pen tip, which effectively shortens the magnetic conduction distance and improves the magnetic conduction efficiency.

Specifically, the front magnetic conductive shell 4 is composed of a large round table 41 and a small round table 42 with a hollow structure. The large round table 41 and a small round table 42 are integrally formed by injection molding. The pen housing 1 is preferably a cylinder. An upper end of the pen housing 1 is connected to the larger diameter end of the large round table, the smaller diameter end of the large round table is connected to the larger diameter end of the small round table, and the front end of the pen core extends from the smaller diameter end of the small round table. As a result, the pen conforms to a better ergonomic shape and the user feels better.

Specifically, the magnetic conductive material is a soft magnetic material, preferably a soft magnetic pellet for MIM. The functional powder is mixed with light-curing resin and thermoplastics with various properties (such as PLA, ABS, PA, PC, PVA, TPE, PS, PMMA, PET, etc.) to make granular plastic particles and the granular plastic particles are injected into the mold. Thereby, the front magnetic conductive shell 4 is injection-molded. Soft magnetic materials have many advantages, such as high magnetic permeability, light and thin molding, and high saturation magnetic induction intensity.

Specifically, the inductance component 2 is a variable capacitance component or a variable inductance component. The magnetic conductive structure is suitable for both types of electromagnetic pens. In addition, the PCB board is provided with an LC resonant circuit. The LC resonant circuit is a conventional technology of an electromagnetic pen, and the electromagnetic induction performance can be significantly improved with the front magnetic conductive shell 4.

As mentioned above, the design of the electromagnetic pen electromagnetic pen with a front end having magnetic conductivity is reasonable. By arranging the front magnetic conductive shell 4 near the front end of the pen tip, the electromagnetic induction is enhanced, the magnetic conductive conditions in the electromagnetic induction are met, and the characteristics of the magnetic field lines of the inclination angle are improved, and the electromagnetic induction is more accurate. The front magnetic conductive shell 4 is composed of a large round table and a small round table with a hollow structure, and the design is reasonable, so that the pen conforms to a better ergonomic shape, and the user has a better sense of use. The front magnetic conductive shell 4 is made of magnetic conductive material. The magnetic conductive material is a soft magnetic material and is injection-molded, with excellent performance, which is conducive to processing and processing precision control.

The above content is a further detailed description of the present application in conjunction with specific preferred embodiments, and it cannot be considered that the specific implementation of the present application is limited to these descriptions. For those of ordinary skill in the technical field of the present application, without departing from the concept of the present application, some simple deductions or substitutions can be made, which should be regarded as belonging to the protection scope of the present application.

What is claimed is:

1. An electromagnetic pen with a front end having magnetic conductivity, comprising a pen housing, an inductance component, and a PCB board, the inductance component and the PCB board are arranged in the pen housing and the inductance component is electrically connected to the PCB board, wherein a front end of the pen housing is provided with a front magnetic conductive shell, and the front magnetic conductive shell is made of magnetic conductive material, a coil is arranged in the front magnetic conductive shell, and the coil is electrically connected to the PCB board, a front end of a pen core protrudes from the front magnetic conductive shell.

2. The electromagnetic pen with a front end having magnetic conductivity according to claim 1, wherein the front magnetic conductive shell is composed of a large round table and a small round table with a hollow structure, an upper end of the pen housing is connected to the larger diameter end of the large round table, the smaller diameter end of the large round table is connected to the larger diameter end of the small round table, and the front end of the pen core extends from the smaller diameter end of the small round table.

3. The electromagnetic pen with a front end having magnetic conductivity according to claim 1, wherein the magnetic conductive material is a soft magnetic material.

4. The electromagnetic pen with a front end having magnetic conductivity according to claim 1, wherein the front magnetic conductive shell is injection-molded.

5. The electromagnetic pen with a front end having magnetic conductivity according to claim 1, wherein the inductance component is a variable capacitance component or a variable inductance component.

6. The electromagnetic pen with a front end having magnetic conductivity according to claim 1, wherein the PCB board is provided with an LC resonant circuit.

* * * * *